United States Patent
Song et al.

(10) Patent No.: US 11,802,767 B2
(45) Date of Patent: Oct. 31, 2023

(54) IN-SITU OBSERVATION SYSTEM FOR BOTTOM BOUNDARY LAYER OVER SHALLOW-WATER COHESIVE SEABED AND ARRANGEMENT METHOD THEREOF

(71) Applicant: OCEAN UNIVERSITY OF CHINA, Qingdao (CN)

(72) Inventors: Dehai Song, Qingdao (CN); Nan Wang, Qingdao (CN); Xianwen Bao, Qingdao (CN); Guangxue Li, Qingdao (CN); Chuanxiang Wang, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 17/761,009

(22) PCT Filed: Aug. 17, 2020

(86) PCT No.: PCT/CN2020/109469
§ 371 (c)(1),
(2) Date: Mar. 16, 2022

(87) PCT Pub. No.: WO2021/169195
PCT Pub. Date: Sep. 2, 2021

(65) Prior Publication Data
US 2022/0341735 A1   Oct. 27, 2022

(30) Foreign Application Priority Data
Feb. 25, 2020   (CN) .......................... 202010115369.2

(51) Int. Cl.
*G01C 13/00*   (2006.01)

(52) U.S. Cl.
CPC .................................... *G01C 13/00* (2013.01)

(58) Field of Classification Search
USPC ......................................... 73/170.29–170.32
See application file for complete search history.

(56) References Cited

FOREIGN PATENT DOCUMENTS

| CN | 105672232 A | * | 6/2016 | |
|---|---|---|---|---|
| CN | 107328552 A | * | 11/2017 | ........... G01C 13/002 |
| CN | 108248777 A | * | 7/2018 | ............. B63B 17/00 |
| CN | 109212152 A | * | 1/2019 | |

(Continued)

*Primary Examiner* — Andre J Allen
(74) *Attorney, Agent, or Firm* — Brian S. Boyer; SYNDICATED LAW, PC.

(57) ABSTRACT

The present disclosure provides an in-situ observation system for a bottom boundary layer (BBL) over a shallow-water cohesive seabed and an arrangement method thereof. It establishes a low-cost and easy-operation hydraulic pile foundation system (2), which can ensure the piling depth to achieve the anti-settling and stability. The stainless-steel sticks are assembled freely to construct the interference-free observation unit (1). As the porous discs are used between the feet of the observation unit (1) and the top of the bottom piles, the observation system can be accurately fixed to the pile foundation. It is thus not limited by the self-weight and can integrate various instruments upon requirement. The components in this system can be easily obtained and conveniently maintained. The present disclosure has the advantages of low-cost and stability, can be widely used for long-term in-situ observation of the BBL.

10 Claims, 4 Drawing Sheets

(56) References Cited

FOREIGN PATENT DOCUMENTS

| | | | | | |
|---|---|---|---|---|---|
| CN | 110579307 | A | * | 12/2019 | ............... G01C 5/04 |
| CN | 111121730 | A | * | 5/2020 | ............. G01C 13/00 |
| CN | 109489626 | B | * | 11/2021 | ............... G01C 5/04 |
| KR | 101375362 | B1 | * | 3/2014 | |

* cited by examiner

IN-SITU OBSERVATION SYSTEM FOR BOTTOM BOUNDARY LAYER OVER SHALLOW-WATER COHESIVE SEABED AND ARRANGEMENT METHOD THEREOF

CROSS REFERENCE TO RELATED APPLICATION

This application is a national stage application of International Application No. PCT/CN2020/109469, filed Aug. 17, 2020, which claims the benefit of Chinese Patent Application No. 202010115369.2, filed on Feb. 25, 2020, each of which is incorporated by reference herein by reference in its entirety.

TECHNICAL FIELD

The present disclosure provides a seabed in-situ observation system, and belongs to the technical field of marine investigation.

BACKGROUND ART

Bottom boundary layer (BBL) is a water layer in the immediate vicinity of the ocean bottom, where the flow structures are obviously affected by the seabed. As a result of mutual interactions between bottom heterogeneous water flows and the seabed, it usually has a large density gradient, a large turbidity gradient, frequent turbulence in the BBL with variable boundary thickness. Due to bottom frictions and turbulent motions, water flows in the BBL dissipate energy in the form of a bottom shear stress. It generates seabed erosion or sediment resuspension from seabed and further the vertical stratification of suspended sediment concentrations, which in turn affects the flow structures. The motions of water and fine sediment in the BBL greatly affect the seabed erosion and siltation, mass transportation, biogeochemical process, etc., and the recognitions to the water and sediment motions in the BBL will be theoretically helpful for construction of ocean engineering such as ports, wharf, bridges, artificial islands and channels in coastal regions, as well as the beach protection, maintenance and restoration and other disaster prevention and reduction technologies.

Presently, in-situ observation for the BBL is one of the main methods to recognize the water and sediment motions in the BBL. It typically implements a seabed-based platform and provides self-contained marine observation instruments on the platform for a continuous observation. The seabed-based platform over the shallow-water cohesive seabed is typically supported by a tripod/quadropod or fixed by piling. Due to the large porosity of sediments on the cohesive seabed, indicating a soft and loose seabed, the foot-supported carrying system on the seabed is often flipped over by its self-weight or subsided due to the seabed erosion and scouring of water flows around the feet. So the measurement will be affected or even the platform will be buried and cannot be recycled. When settlement plates are used, sizes of the settlement plates depend on the weight of the observation system; in case of large plates they will squeeze the observation space inside the frame but in case of small plates the anti-settling effect will be weakened.

Regarding a pile carrying system, the observation frame can stand on the bottom piles to prevent the subsidence. However, due to high cost and complex operation of the drilling rig, one or two piles are usually driven for carrying. High-pressure water-jet drilling is relative cost-effective and flexible. However, in the prior art it only gives the considerations to generate the high-pressure water flows, specifically, by raising the pressure and reducing the diameter of the water-jet pipe, in order to place pile pipes into the pit slots. Using this method, the consolidated layer cannot be broken through, such that the pile depth is limited (about 3 m); the scoured pit is usually large in the surface seabed to affect the observation space; and there is a further need to provide devices such as the global positioning system (GPS), depthometer and booster pump. Therefore, the high-pressure water-jet drilling is defective in some aspects such as the stability of the pile foundation and the flexibility of the operation (for example, the simple deep-sea piling device disclosed by the Chinese patent application CN 201720662009.8).

The BBL observation accuracy, parameter diversification, seabed subsidence, stability of the pile foundation, convenience in operation and other technical and economic problems have become obstacles to observation for the BBL over the shallow-water cohesive seabed for a long time; and concerning that, the existing technical solutions are far from satisfactory in economy, convenience, stability, modularization and parameter diversification.

SUMMARY

An objective of the present disclosure is to provide an in-situ observation system for water and sediment motions in a BBL over a shallow-water cohesive seabed and an arrangement technology thereof, to overcome the shortages of the prior art.

The present disclosure designs the low-cost, easy-to-operate, interference-free, modularized, anti-settling, safe and stable observation system and the arrangement technology based on hydraulic scouring, vibration and soil liquefaction principles, and provides platforms for continuous, accurate and comprehensive observation for the water and sediment motion on the shallow-water cohesive seabed. Through the modularized stainless-steel frame and the assembled hydraulic pile foundation system with low cost, easy arrangement and simple operation, the present disclosure arranges the in-situ observation system for the BBL over the shallow-water cohesive seabed. The present disclosure can provide the arrangement and observation space for multiple instruments to the utmost extent, reduce the interference on water flows by the frame and the subsidence of the observation system, and lower the arrangement and observation cost, and thus achieves the optimal economic configuration.

To achieve the above objective, the present disclosure adopts the following specific technical solutions:

An in-situ observation system for a BBL over a shallow-water cohesive seabed includes: an upper assembled interference-free observation unit, a lower hydraulic pile foundation unit and a connecting unit for connecting and fixing the above two units.

Further, the assembled interference-free observation unit may include an upper instrument arrangement region and a lower observation region; and the instrument arrangement region and the observation region each may be a frame composed of stainless-steel sticks having different diameters and lengths (7 in FIG. 1).

Further, the observation region may be of a trapezoidal structure.

Further, the lower hydraulic pile foundation unit may include multiple (four in general) pile pipes.

Further, the connecting unit may include porous discs, namely discs each including multiple large circular holes, and the porous discs may be respectively fixed on the top of the hollow pile pipes of the lower hydraulic pile foundation unit and the bottom of the upper assembled interference-free observation unit to connect and stabilize the upper and lower structures.

Further, the observation system may include a locating unit for locating the multiple pipes of the lower hydraulic pile foundation unit.

Further, the locating unit may be mainly composed of stainless-steel sticks (13 in FIG. 4); two ends of each of the sticks may be respectively connected to a semicircular ring having a diameter greater than a diameter of each of the porous discs; after one point is fixed, the other three points of the lower hydraulic pile foundation unit may be determined by assembling the four pipes into a rectangle having a same size as the bottom of the observation unit; and upon the completion of locating, the locating unit may be removed.

The lower hydraulic pile foundation unit may be specifically arranged as follows:

performing pilling according to a soil liquefaction mechanism in soil mechanics; and pressurizing and pumping seawater with a generator to an ordinary slender steel pipe to form a high-pressure water-jet structure; placing the high-pressure water-jet structure in a hollow pile foundation and inserting both into the seabed surface, where with scouring of a high-pressure water flow to the seabed, pore water in seabed soil is supersaturated and the soil is liquefied, thereby inserting each of the hollow pile pipes into the seabed and achieving a piling purpose; and in case of a hard consolidated silt layer into which the water flow cannot scour downward continuously, a manual or mechanical auxiliary vibration on the pile pipe or the water-jet pipe can be applied to accelerate the penetration of pore water and liquefaction of soil in the consolidated layer.

An arrangement method of an in-situ observation system for a BBL over a shallow-water cohesive seabed includes:

(1) constructing an assembled interference-free observation unit, where stainless-steel sticks (7 in FIG. 1) are assembled freely to construct an instrument arrangement region and an interference-free observation region, and the instrument arrangement region may be adjusted and provided according to a user requirement;

(2) arranging a lower hydraulic pile foundation unit: performing pilling according to a soil liquefaction mechanism in soil mechanics; and pressurizing and pumping seawater with a generator to an ordinary slender steel pipe to form a high-pressure water-jet structure; placing the high-pressure water-jet structure in a hollow pile foundation and inserting both into the seabed surface, where with scouring of a high-pressure water flow to the seabed, pore water in seabed soil is supersaturated and the soil is liquefied, thereby inserting each of the hollow pile pipes into the seabed and achieving a piling purpose; and in case of a hard consolidated silt layer into which the water flow cannot scour downward continuously, a manual or mechanical auxiliary vibration on the pile pipe or the water-jet pipe is used to accelerate the penetration of pore water and liquefaction of soil in the consolidated seabed;

(3) respectively fixing porous discs of a connecting unit on the top of the hollow pile pipes of the lower hydraulic pile foundation unit and the bottom of the upper assembled interference-free observation unit, to connect and stabilize the upper and lower structures.

Further, in the above steps, after one hollow pile pipe is fixed, a position of each of the other three hollow pile pipes may be determined by a locating unit, the other three hollow pile pipes may be fixed with the above fixing method, and then the locating unit may be removed.

The present disclosure has the following advantages and technical effects:

The present disclosure achieves the following technical advantages:

(1) The present disclosure constructs a simple, low-cost and easy-to-operate hydraulic pile foundation system instead of the drilling rig foundation system, which can not only ensure the pile depth and implement the anti-settling and stabilizing functions of the seabed-based observation system, but also provide piles at specified quantities and positions as required during arrangement of the observation system, with the easy operation and low economic cost.

(2) In view of characteristics of the BBL observation frame such as "no interference", "modularization", and "parameter diversification", the stainless-steel sticks are assembled freely to construct the instrument arrangement region and the interference-free observation region, thus implementing the integration of various instruments, and further preventing the interference of the instrument frame from affecting the observation space. The instrument arrangement region can be adjusted and provided according to the user requirement.

(3) As the discs are used between the feet of the observation frame and the top of the bottom piles for fixation, the observation system is not limited by the self-weight, the observation space is not occupied, and the stability of the observation system can be ensured during extreme weathers, thus overcoming the shortages of the settlement plate.

The present invention achieves the following positive effects over the prior art:

1) Low cost and easy operation: All components of the units are easily obtained, cheap, portable and easy-to-operate; compared with the drill piling and the high-pressure water jetting, the cost is lowered, and the penetration depth can completely ensure the stability of the observation system and prevent the subsidence; and the present disclosure has the universal applicability for the shallow-water cohesive seabed having a certain sedimentary thickness. 2) Flexible and comprehensive measuring parameters: The instrument mounting unit is assembled with the stainless-steel sticks flexibly and freely for fixation of various sensors, with the outer frame made according to user requirements (e.g., ship capacity) and the inner assembly method determined according to instrument requirements (e.g., the acoustical and optical instrument for water and sediment movement), so the assembly process is simple and easy to operate. 3) Large observation space and no interference from the frame: The observation region is of the stainless-steel-stick trapezoidal structure, and only sticks at edges can interfere water flows. However, as the sticks often have the diameters of not greater than five centimeters, and the distances from the center of the observation space to the sticks at the edges are greater than one meter, the influences from the frame are substantially prevented; and even though the frame is scaled down, the diameters of the stainless-steel sticks are also reduced for the lighter weight, thus preventing the influences on water flows.

In the figures: 1—assembled interference-free observation unit, 2—lower hydraulic pile foundation unit, 3—connecting unit, 5—instrument arrangement region, 6—observation region, 7—stainless-steel sticks, 8—generator, 9—water hose, 10—high-pressure water-jet structure, 11—hollow pile pipe, 12—porous disc, 13—stainless-steel sticks, and 14—semicircular ring.

DETAILED DESCRIPTION OF THE EMBODIMENTS

Specific implementations of the present disclosure will be described below in combination with specific embodiments and accompanying drawings.

Embodiment 1

Figure 3:
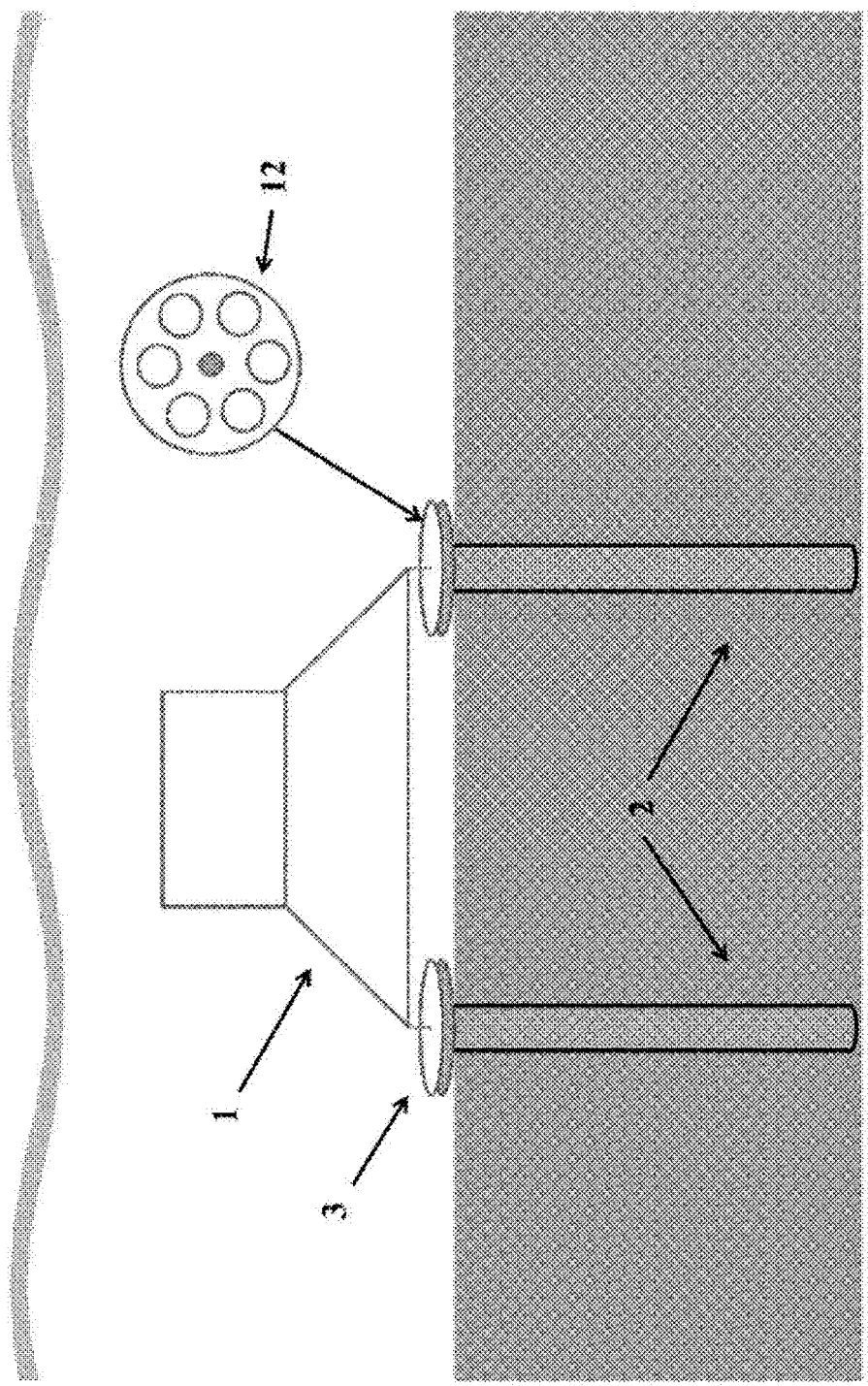
FIG. 3 is a schematic view for arranging a connecting unit according to the present disclosure.

An in-situ observation system for a BBL over a shallow-water cohesive seabed includes: an upper assembled interference-free observation unit 1 (FIG. 3), a lower hydraulic pile foundation unit 2 (FIG. 3), a connecting unit 3 (FIG. 3) for connecting and fixing the above two units, and a locating unit for locating the lower hydraulic pile foundation unit 2.

The upper assembled interference-free observation unit 1 is composed of solid stainless-steel sticks 7 (FIG. 1) having different diameters and lengths, instrument fasteners, and matched screws and nuts. For the upper instrument arrangement region, the stainless-steel sticks can be assembled freely into fixing supports according to the quantities, sizes, orientations, positions and other requirements of the instruments, so as to implement the multi-instrument, multi-parameter and comprehensive observation. The lower trapezoidal observation region is intended to prevent influenced water flows caused by surrounding sticks from affecting the measurement in the middle region.

Figure 2:
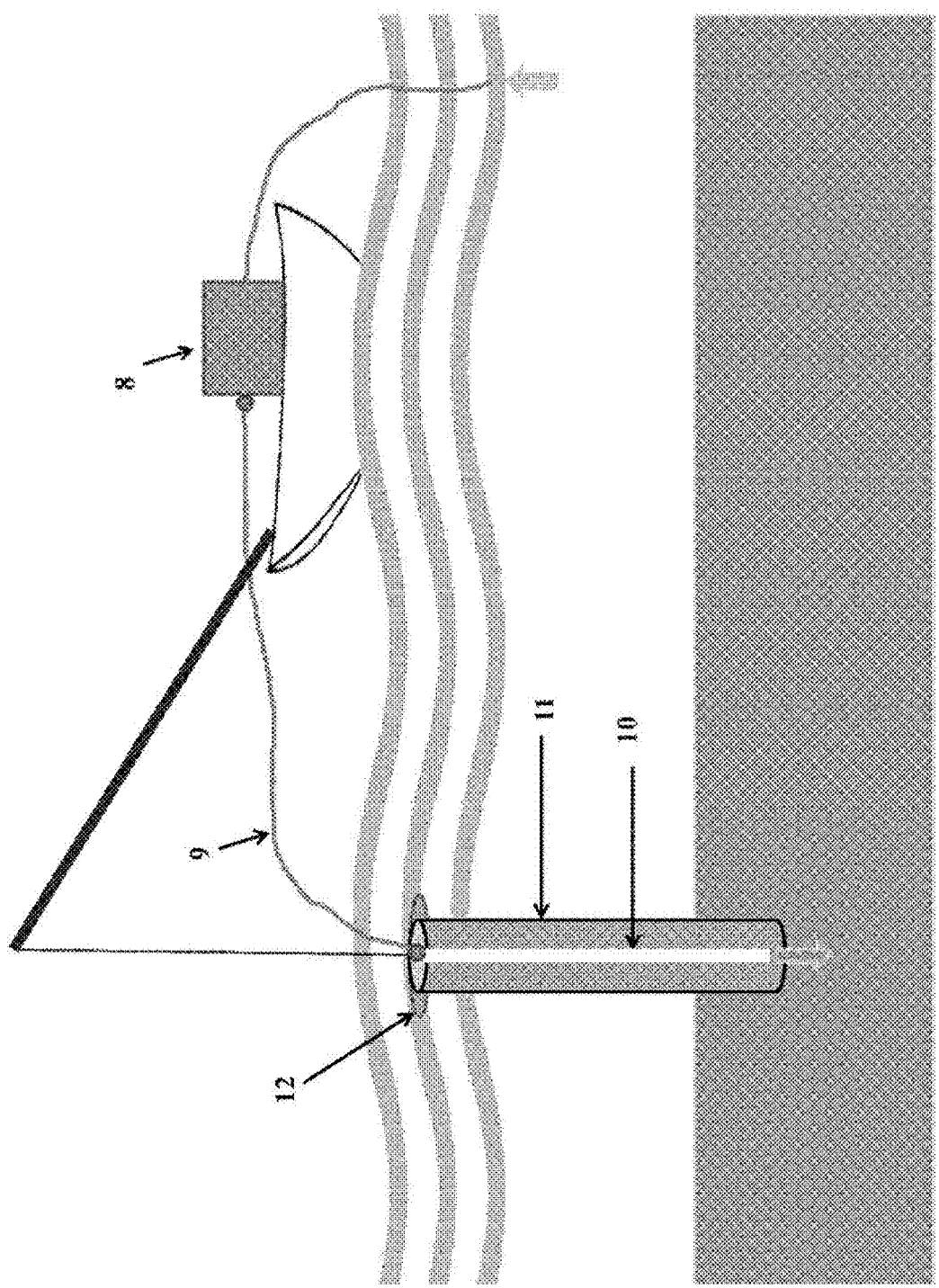
FIG. 2 is a flow chart for arranging a hydraulic pile foundation unit according to the present disclosure.

The lower hydraulic pile foundation unit 2 includes: a gasoline (diesel) generator 8 (FIG. 2), water hoses 9 (FIG. 2), a steel-pipe high-pressure water-jet structure 10 (FIG. 2) and a hollow pile pipe 11 (FIG. 2). It is proposed to use the winch on the fishing boat and provide a mechanical vibration device or a manual vibration device. The unit mainly functions to pump seawater and pressurize it for jetting, thus scouring the seabed soil in the pile pipe for liquefaction and dispersion, reducing the penetration resistance of the pile pipe, and implementing the low-cost and easy-to-operate piling purpose.

The connecting unit 3 includes: porous discs 12 (FIG. 3), namely stainless-steel sticks having multiple large circular holes, and stainless-steel screws, nuts or ropes. Eight porous discs divided into two groups 12 (FIG. 1 and FIG. 2) are respectively fixed on the top of hollow pile pipes and feet of the observation frame with the help of a diver, to connect and stabilize the upper and lower structures.

Figure 4:
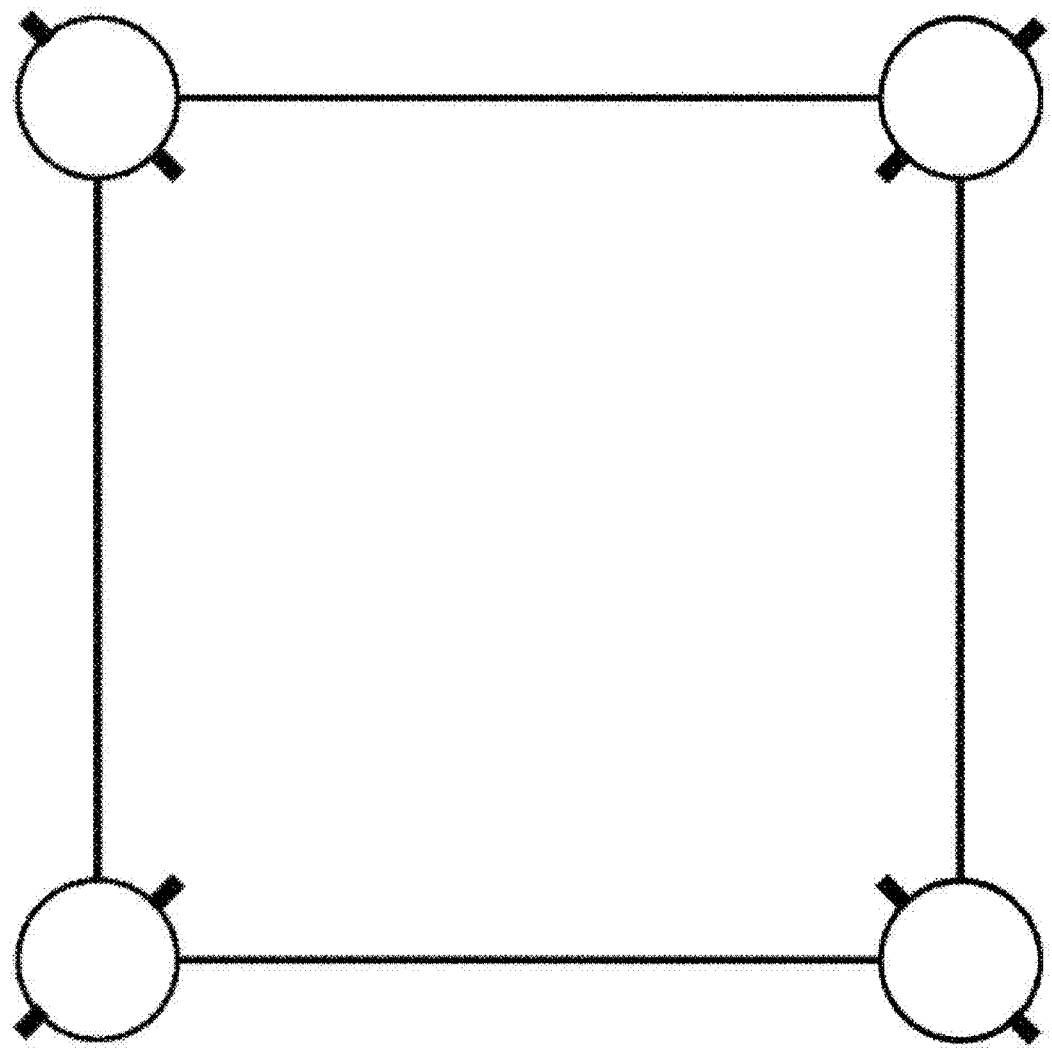
FIG. 4 is a schematic view illustrating a structure of a locating unit according to the present disclosure.
Figure 4:
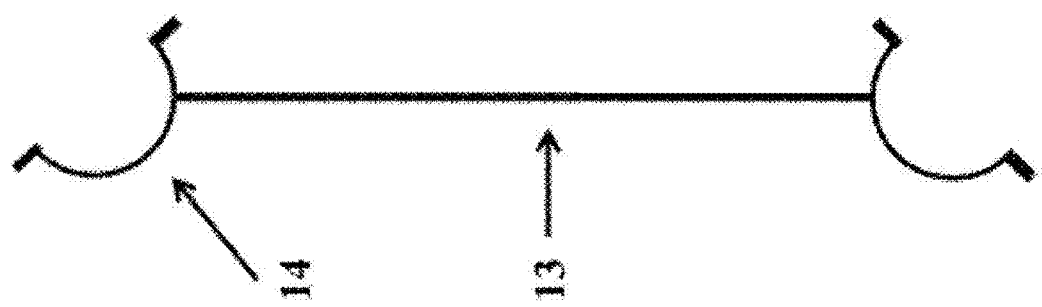

The locating unit is composed of stainless-steel sticks 13 (FIG. 4) that are as long as the bottom sticks of the observation unit 1. Two ends of each of the stainless-steel sticks 13 are respectively connected to a semicircular ring 14 (FIG. 4) having a diameter greater than that of the porous disc. Four stainless-steel sticks can be assembled into one rectangle frame having the same size as the bottom of the observation unit 1, and configured to locate four hollow pile pipes 11 by passing the pile pipes through the semicircular rings; and upon the completion of locating, the unit 3 may be removed.

Figure 1:
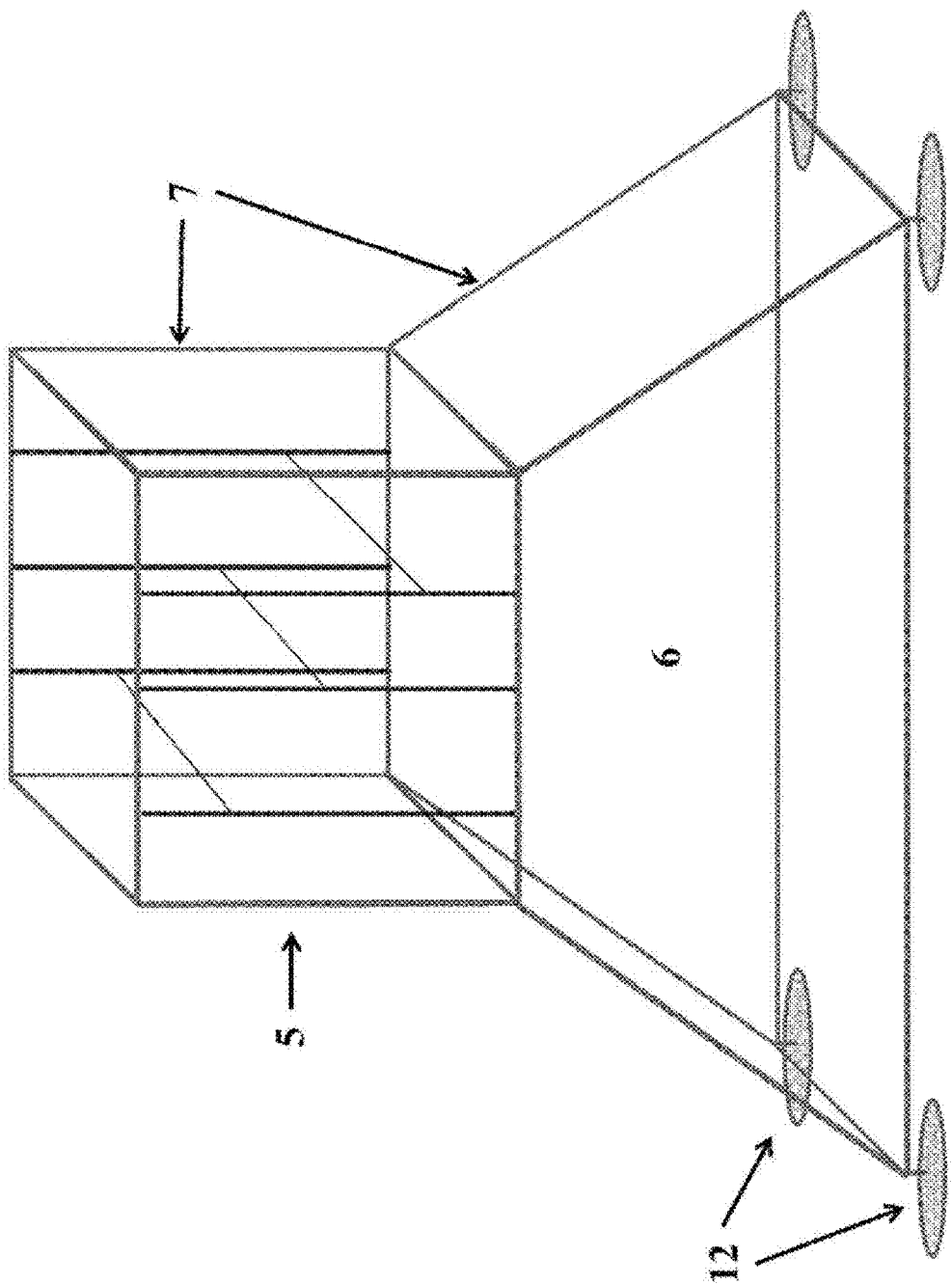
FIG. 1 is a schematic view illustrating a structure of an assembled interference-free observation unit according to the present disclosure.

The above units are arranged and connected as follows:

First of all, the observation unit 1 is assembled. Two functional regions: The upper functional region is the instrument arrangement region 5 (FIG. 1) that can be assembled and adjusted, where the basic frame is a cuboid composed of the solid stainless-steel sticks 7, and the space within the cuboid can be freely assembled as required with the stainless-steel sticks for fixation of various instruments. The lower functional region is the interference-free observation region 6 (FIG. 1). In order to reduce or eliminate the influence of the frame as much as possible, the lower space region is a trapezoidal space. To ensure the stability of the observation system, slenderer solid stainless-steel sticks are used as the trapezoidal boundary. The distance from the center of the trapezoidal space to each boundary stick is more than 10 times the diameter of the stick, and thus the water flows in the center space will not be interfered by the boundary sticks. If less instruments are required for measurement, the observation frame may be scaled down, and the diameter of the solid stainless-steel stick 7 can also be reduced.

Next, the hydraulic pile foundation unit 2 is fixed. The generator 8 is used to pressurize and pump seawater. The seawater is pressurized and delivered through water hoses 9, of which two ends are fixed (for the purpose of preventing looseness during pressurization). The tail end of each of the hoses is connected to a hollow slender steel pipe with a certain length. Water flows are ejected out through the slender steel pipe to form a high-pressure water-jet structure 10. The high-pressure water-jet structure 10 is placed in the hollow pile pipe 11, both hoisted by the winch on the fishing boat, and penetrated into the seabed by its-self weight (the perpendicularity is controlled). Under the scouring of the high-pressure water-jet and the soil liquefaction, the soil in the hollow pile pipe is gradually loose, and the penetration resistance is greatly reduced. Therefore, the pile pipe can be easily penetrated into the seabed for more than ten meters. The hard consolidated silt layer is inevitable during penetration. By only manually or electrically vibrating (such as lifting) the pile pipe or the water-jet pipe, the saturation of pore water in the soil of the consolidated layer can be accelerated, and the soil in the consolidated layer is gradually liquefied and loosened; and through repeated operation, the pile pipe can be continuously penetrated downward. After the first pile is completed, the assembled locating unit is sleeved on the first pile and thus positions of the other piles can be determined. By repeating the above steps, all pile pipes are penetrated into the seabed and fixed.

At last, the locating unit is removed and recycled, and the upper assembled interference-free observation unit 1 and the lower hydraulic pile foundation unit 2 are connected and stabilized through the connecting unit 3. Upon the completion of piling, ropes are tied on the top of the piles and connected to the boat to hoist the assembled observation unit 1, and the porous discs 12 at the feet pass through the ropes and are slowly released down to the seabed along the ropes. Upper and lower discs may be substantially abutted; and when released, the discs can be abutted more accurately with the help of a diver. At last, the discs are fixed by the diver with the stainless-steel screws or the ropes. Through multiple cruise, it is indicated that when the quadropod is used, the stabilizing and anti-settling effects can be achieved by fixing only one hole on each disc.

During the recycling process, the stainless-steel screws or the ropes of the connecting unit are removed by the diver; and sediments on the feet and the discs can be manually removed by the diver or soured by the high-pressure water jet (usually, the annual deposition rate for the region where the deposition rate is high is only at the centimeter-level). Then, the observation unit 1 is pulled up by the winch to the deck for detachment, washing and maintenance. Pile pipes deeply penetrated into the seabed cannot be recycled but can be marked by a buoy and are reused in next cruise when necessary.

It is to be noted that any region with high siltation rate shall not be selected as the observation site, regardless of what seabed-based platform is used for observation; or otherwise, the observation system may be buried and cannot be recycled. For example, in the estuary of the Yellow River during water and sediment regulation, the observation system will be completely buried within several days.

The hydraulic pile foundation system in the present disclosure is mainly piled with the soil liquefaction mechanism in soil mechanics, without the devices such as the booster pump, GPS, depthometer and ultra-fine jetting head. The common mobile gasoline (diesel) generator is used to pressurize and pump seawater to the ordinary slender steel pipe, thus achieving the effect of the high-pressure water-jet; the steel-pipe high-pressure water-jet is placed in a hollow pile foundation and then both are placed at the seabed, where with scouring of a high-pressure water flow to the seabed, pore water in seabed soil is supersaturated and the soil is liquefied, thereby inserting the pile foundation into the seabed and achieving the piling purpose; and in case of a hard consolidated silt layer into which the water flow cannot scour downward continuously, a manual or mechanical auxiliary vibration on the pile pipe or the water-jet pipe is used to accelerate the penetration of pore water and liquefaction of soil in the consolidated seabed and thus only the piling time is longer than that on the surface seabed. In order to ensure the vertical piling toward the seabed, the simple crane on the rear deck of the boat is used to hoist the pile foundation. In addition, as the high-pressure water-jet is not additionally pressurized and is placed inside the pile pipe, there is no large scoured pit and seabed out of the pile pipe will not be affected. Devices such as the hollow pile pipe, slender steel pipes and mobile generator formed into the system are low in cost and easy in assembly and operation; and winches can also be found in most fishing boats.

Embodiment 2

The in-situ observation system for the water and sediment motion of the BBL over the shallow-water cohesive seabed (the observation system provided by Embodiment 1) has been repeatedly implemented in coastal waters such as the Bohai Bay, Laizhou Bay and Jiaozhou Bay in China (for the usage method, see Embodiment 1) to perform the long-term, continuous and multi-layer observation. As a result, a great amount of desirable observed data under extreme weathers, anthropogenic activities and so on have been obtained. It turns out that the system can be used in different situations, and have wide applications. For the implemented cases, the observed water depths ranged from 5 m to 15 m; the measured period ranged from three days to one year; and up to 10 instruments were used at one time with a maximum weight of 800 kg. The seabed of observed sites were mainly cohesive silt or mud, with a sedimentary thickness of more than ten meters; and the maximum penetrated depth of the pile foundation was about 12 m.

Taking the in-situ observation in the western Laizhou Bay as an example, the measurement lasted for about one month and the water depth at the station was about 6 m. Under the influence of the Yellow River, the upper stratum belongs to the modern Yellow River Delta lateral margin deposition, mostly in a soft-plastic and flow-plastic state, with a high soil moisture rate, high compressibility, low intensity, low compression resistance, and a thickness of about 8-10 m; the middle is a shallow-marine deposit stratum with a silt and silty-clay alternating layer, better engineering properties than the upper layer, and a thickness of about 10 m; and the bottom stratum is a continental deposit layer, with the increased sand content and high shear resistance. During the implementation, a common fishing boat served as the offshore operation platform and a diver was employed for assistance. The fishing boat is provided with the winch, power supply, ropes and the like on the deck. Two acoustic Doppler current profilers (ADCPs), one acoustic wave and current (AWAC), one conductivity temperature depth (CTD), one acoustic doppler velocimetry (ADV), one laser in-situ scattering transmissometer (LISST), one wave and tide logger (D|Wave), two optical backscatter point sensors (OBSs) and one battery compartment were used according to the observation requirements. The frame of the instrument arrangement region has dimensions of 1 m×1 m×1 m; the trapezoidal observation region has the top side of 1 m×1 m, and the bottom side of 2 m×2 m; and four bottom feet are connected to the discs.

First of all, the interference-free observation unit 1 was assembled on the deck of the fishing boat or on the shore. According to sizes, orientations, observation layers and other requirements of the instruments, positions of the self-contained instruments were configured, and the deployment time was set. Solid stainless-steel sticks, of which two ends were detachable, were used to fix all instruments in the center of the unit; and the lower observation region could provide enough space for measurement without the influence of the frame on water flows. The locating unit of the corresponding size (2 m×2 m) was made in advance according to the bottom rectangle of the frame.

Next, the lower hydraulic pile foundation unit 2 was used for piling. The gasoline generator was mounted on the rear deck, and firmly connected by the water hoses and the slender steel pipes (having a length of about 7 m and an inner diameter of about 3 cm) to form the steel-pipe high-pressure water-jet; the hollow pile pipes were waste metal oil-delivery pipes each having a length of about 10 m and an inner diameter of about 10 cm; and the porous discs in the connecting unit were welded on the top of the piles, and a rope tying position was reserved on the top of each of the piles. The pile pipe was hoisted by the winch, the high-pressure water-jet was placed inside the pile pipe, and the generator was turned on to eject the high-pressure water flows to penetrate into the seabed. As the surface soil was loose, the high-pressure water flow scoured the surface soil quickly and the pile pipe was penetrated into the soil for 2-3 m easily by the gravity; at the 4-5 m below the seabed surface where the consolidated silt layer was present, the penetration was obviously reduced or suspended; and in this case, the vertical pile pipe and the water-jet pipe were vibrated by lifting with hands or the winch, and through repeated operation, the consolidated layer was liquefied and became loose, the dark mud was surged out from the upper end of the pile pipe and the pile pipe was continuously penetrated into the seabed downward; and when the pile pipe was penetrated into the seabed for 10 m, the generator was turned off. Upon the completion of the piling, the locating unit made in advance was sleeved on the first pile pipe; and then, the fishing boat was moved, and the rest pile pipes were continuously penetrated into the seabed according to the positions fixed by the other three rings on the locating unit.

At last, the locating unit was removed upon the completion of piling. To connect the observation unit 1 and the pile foundation unit 2, ropes were tied on the discs at the top of the piles with the help of the diver, which further went through the discs at the bottom of the unit 1 on the deck. Then the observation unit 1 was hoisted and slowly released down to the seabed of the unit 2 along the ropes. Upper and lower discs were substantially abutted accurately with the help of the diver, and then the discs were fixed by the stainless-steel screws.

After one month, the observation unit was recycled. The stainless-steel screws of the connecting unit 3 were firstly removed by the diver, and the observation unit 1 was then pulled up by the winch to the deck for detachment, washing and maintenance. A buoy was moored on the pile pipe for marking. After half a year, the pile foundation was used to conduct another measurement for one month. The observation system experienced two winter storms and even a fishing boat bottom trawl, but the observation system was kept no tilt and the observation frame and all instruments were safe. Therefore, desirable observed data for the BBL was obtained.

As can be seen from the above embodiments, the observation system and the arrangement method provided by the present disclosure can effectively solve the problems in the prior art, has the simple operation and low cost, can be used repeated for a long time, and can obtain stable observation data.

What is claimed is:

1. An in-situ observation system for a bottom boundary layer (BBL) over a shallow-water cohesive seabed, comprising: an upper assembled interference-free observation unit (1), a lower hydraulic pile foundation unit (2) and a connecting unit (3) for connecting and fixing the above two units.

2. The observation system according to claim 1, wherein the assembled interference-free observation unit (1) comprises an upper instrument arrangement region (5) and a lower observation region (6); and the instrument arrangement region (5) and the observation region (6) each are a frame composed of sticks (7) having different diameters and lengths.

3. The observation system according to claim 2, wherein the observation region (6) is of a trapezoidal structure.

4. The observation system according to claim 1, wherein the lower hydraulic pile foundation unit (2) comprises hollow pile pipes (11).

5. The observation system according to claim 1, wherein the connecting unit (3) comprises porous discs (12), namely discs each comprising multiple large circular holes, and the porous discs (12) are respectively fixed on the top of the hollow pile pipes (11) of the lower hydraulic pile foundation unit (2) and the bottom of the frame of the upper assembled interference-free observation unit (1), to connect and stabilize the upper and lower structures.

6. The observation system according to claim 1, further comprising a locating unit for locating the lower hydraulic pile foundation unit (2).

7. The observation system according to claim 6, wherein the locating unit is mainly composed of sticks (13); two ends of each of the sticks (13) are respectively connected to a semicircular ring (14) having a diameter greater than a diameter of each of the porous discs; after one point is fixed, the other three points of the lower hydraulic pile foundation unit (2) are determined by assembling the sticks (13) into a rectangle having a same size as the bottom of the observation unit (1); and upon the completion of locating, the locating unit is removed.

8. The observation system according to claim 1, wherein the lower hydraulic pile foundation unit (2) is specifically arranged as follows: performing pilling according to a soil liquefaction mechanism in soil mechanics; and placing a high-pressure water jet structure (10) in a hollow pile foundation and inserting both into the seabed, wherein with scouring of a high-pressure water flow to the seabed, pore water in seabed soil is supersaturated and the soil is liquefied, thereby inserting each of the hollow pile pipes (11) into the seabed and achieving a piling purpose; and in case of a hard consolidated silt layer into which the water flow does not scour downward continuously, a manual or mechanical auxiliary vibration on the pile pipe or the water-jet pipe is used to accelerate the penetration of pore water and liquefaction of soil in the consolidated seabed.

9. An arrangement method of an in-situ observation system for a bottom boundary layer (BBL) over a shallow-water cohesive seabed, comprising:

(1) constructing an assembled interference-free observation unit (1), wherein sticks (7) are assembled freely to construct an instrument arrangement region and an interference-free observation region, and the instrument arrangement region is adjusted and provided according to a user requirement;

(2) arranging a lower hydraulic pile foundation unit (2): performing pilling according to a soil liquefaction mechanism in soil mechanics; and placing a high-pressure water-jet structure (10) in a hollow pile foundation and inserting both into the seabed, wherein with scouring of a high-pressure water flow to the seabed, pore water in seabed soil is supersaturated and the soil is liquefied, thereby inserting each of hollow pile pipes (11) into the seabed and achieving a piling purpose; and in case of a hard consolidated silt layer into which the water flow does not scour downward continuously, a manual or mechanical auxiliary vibration on the pile pipe or the water-jet pipe is used to accelerate the penetration of pore water and liquefaction of soil in the consolidated seabed; and (3) respectively fixing porous discs (12) of a connecting unit (3) on the top of the hollow pile pipes (11) of the lower hydraulic pile foundation unit (2) and the bottom of a frame of the upper assembled interference-free observation unit (1), to connect and stabilize the upper and lower structures.

10. The arrangement method of an observation system according to claim 9, wherein in the step (2), after one hollow pile pipe (11) is fixed, a position of each of the other three hollow pile pipes (11) is determined by a locating unit, the other three hollow pile pipes (11) are fixed with the above fixing method, and then the locating unit is removed.

* * * * *